United States Patent Office 3,518,858
Patented July 7, 1970

3,518,858
METHOD OF CONTINUOUSLY CONTROLLING THE CORRECTING APPARATUS FOR WORKPIECE SHAPE DURING ROLLING
Masamoto Kamata, Tokyo, Japan, assignor to Nippon Kokan Kabushiki Kaisha, Tokyo, Japan
Filed Nov. 29, 1967, Ser. No. 687,287
Claims priority, application Japan, Nov. 30, 1966, 41/77,976
Int. Cl. B21b 29/00, 37/08
U.S. Cl. 72—19  4 Claims

ABSTRACT OF THE DISCLOSURE

To control size of a workpiece in rolling mills, a signal representative of optimum bending force, as determined from experience tables and stored in a computer is converted to a force signal controlling force between the rolls; in continuous operation, sensed force signals from the computer are compared with optimum bending force signals, and error signals then control application of force between the rolls.

---

The present invention relates in general to the control of rolling force in rolling mills to obtain predetermined thicknesses of workpieces leaving a rolling mill, and more particularly to the continuous control of rolling mill apparatus by using a measured value of rolling load and data correlating such load to thickness, rather than detecting the thickness of workpieces during rolling itself.

It has been known in the prior art to grind the work rolls of a rolling mill to have a predetermined amount of crown in order to minimize change of the workpiece, e.g. steel strip, from a given size. In connection with the above crown, it has also been known to vary the thickness of the rolled strip by applying a force between the work rolls, or back-up rolls, if used, with hydraulic pressure or other suitable force means to effect a bending of the rolls themselves. It is still difficult to measure the strip itself, however, and automatic control to control the rolling apparatus has been met with difficulty. Manual control, relying on operator judgment, is still used. During rolling, differences in the thickness of steel strip in the order of microns will be beyond an operator's control, particularly since methods of measuring differences in thickness, in the micron order or less, are hard to detect. Therefore, continuous control by correcting the setting of the apparatus has little utility.

The present invention involves both apparatus and method for automatically regulating the delivery of a workpiece. Apparatus is provided to measure rolling load; from experimental data, stored in a computing system, the bending force sufficient to correct variation in thickness of the workpiece shape is determined and a correcting rolling load value is applied. The control system is based upon the above computing process. The invention can be applied to both hot mills and cold mills.

The present invention will become apparent from the following detailed description with reference to the accompanying drawings in which.

Figure 1:
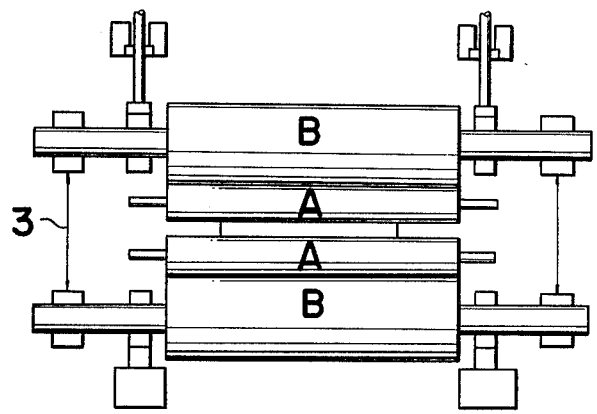
FIG. 1 is a schematic top view of a typical rolling mill structure in whoch the force, in accordance with the present invention is applied to the back-up-rolls.
Figure 2:
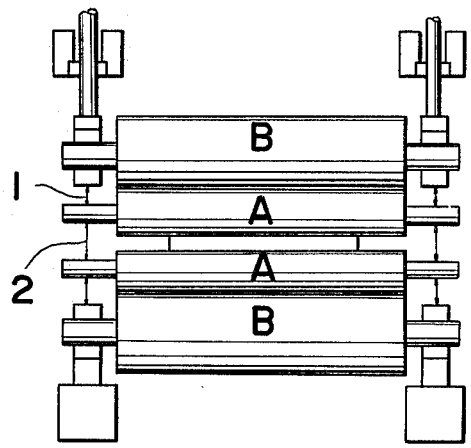
FIG. 2 illustrates another correcting structure applying the above force to the work rolls.

FIGS. 1 and 2, as stated above, illustrate a typical correcting structure for a hot or cold mill having suitable individually controlled screwdown mechanisms. A and B are work rolls and back-up rolls, respectively, and numerals 1, 2, and 3 designate respective directions of the bending force applied through a suitable force device as known in the art. In using the above structure, a hydraulic pressure system is generally adopted to apply force. The present invention is directed to the automatic control for said structures during the rolling for said workpiece, to enable detection of thickness deviation across the workpiece strip. The present invention has striven to solve the above problems by many calculations and repeated laboratory tests. The results, are represented in FIG. 3 and FIG. 4.

Figure 3:
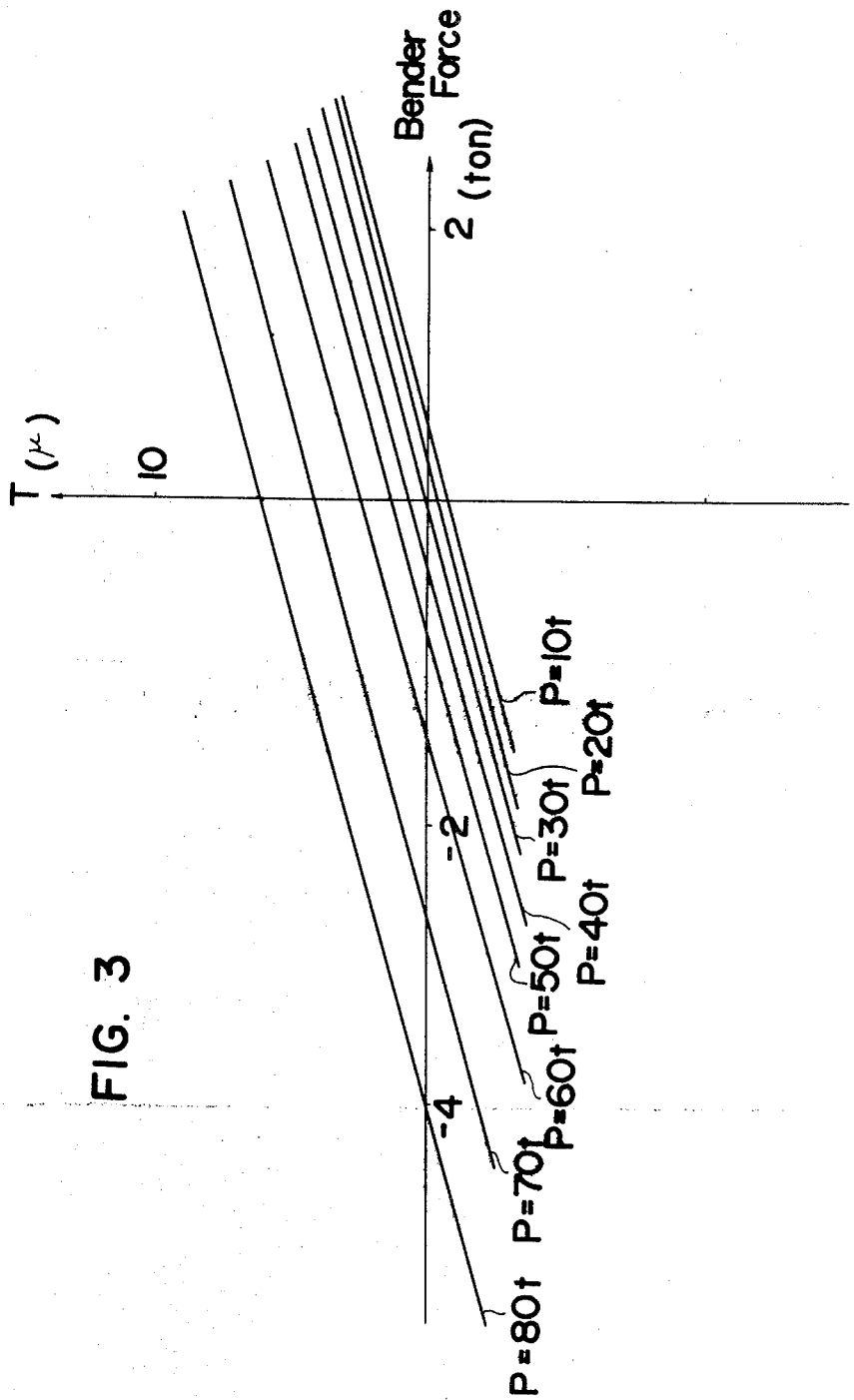
FIG. 3 is a graph showing change, when the width of workpiece is constant, between the deviation of its edge thickness and center thickness in cross direction of said strip (ordinate) with the bending force computed in relation to rolling load (abscissa).

FIG. 3 shows the difference between edge thickness and center thickness, at the ordinate, while the abscissa indicates a bending force. The oblique lines show rolling load P. The positive sign signifies bending force 1 in FIG. 2, which is the same as the negative of force 2. The zero point is the indication that the bending forces of the above 1 and 2 are not acted on. For any one width of said strip, it is understood from FIG. 3 that a settled relation between the bending force and the difference T of said thickness through a rolling load selected determines an operating parameter.

When the working roll is ground to have no crown, according to FIG. 3, force line intersection with the axis of abscissa indicates that the bending force will cause a good shape strip to be obtained. If a crown roll is used, the abscissa axis will shift up and down.

Figure 4:
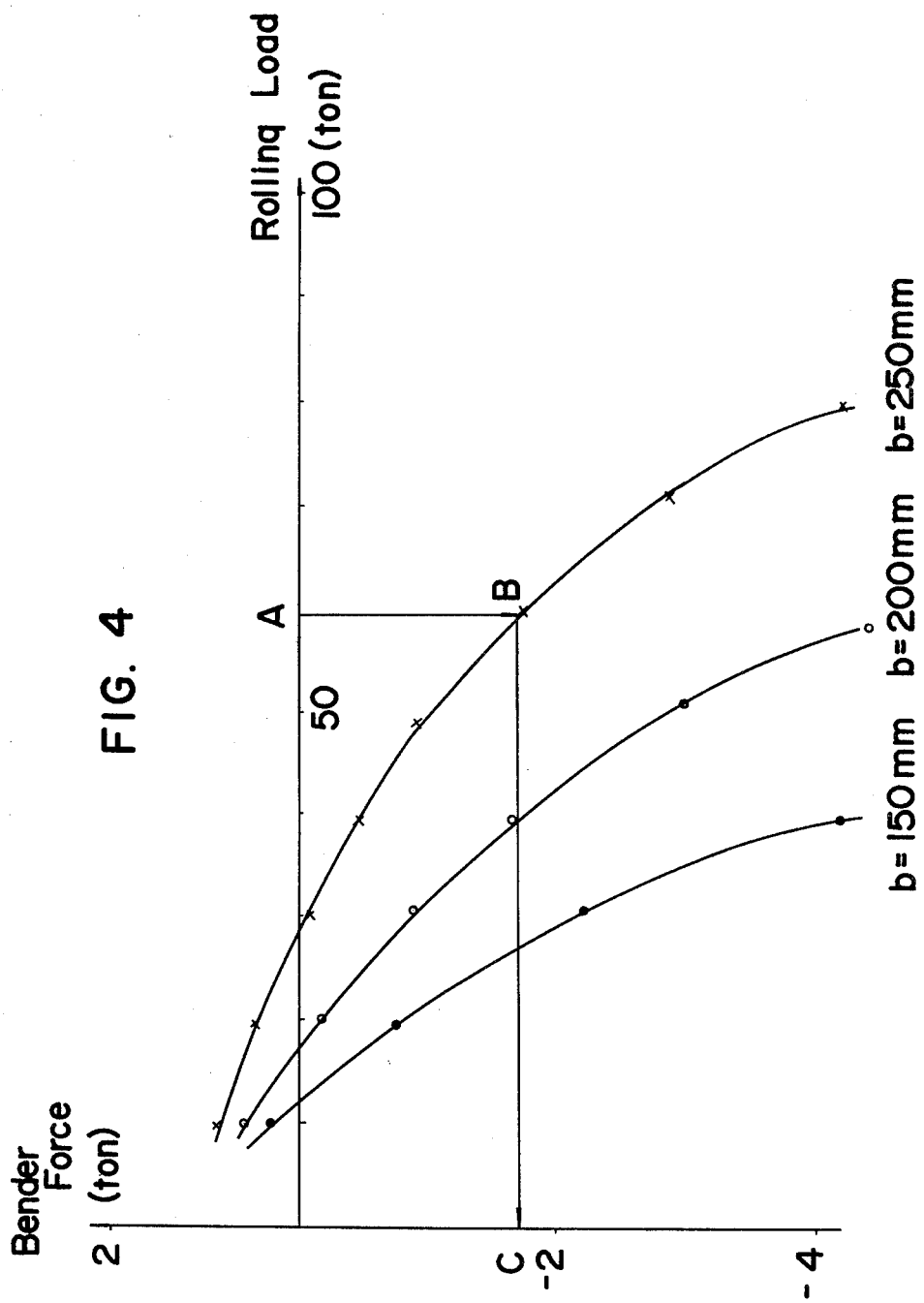
FIG. 4 is a diagram showing the relation between a rolling load (abscissa) and its most suitable bending force (ordinate) in case of a variation in width of said strip.

A graph relating to changes of width on said workpiece strip is shown in FIG. 4.

As the results of considerable experimentation, FIG. 4 was obtained by making said strip width $b$ a function of combining the best suitable bending force with rolling load. It is understood that the above relation is described as a curved line, and yet a settled relationship appears. Accordingly, with strip width given, it is possible to find out the best suitable bending force to said rolling load from FIG. 4. To take an example on laboratory test, the bending force to which a strip having a width of 250 mm. is rolled with load of 60$t$ may be determined by following up A→B→C on FIG. 4, resulting in $C-=1.7t$. In this way, it has become possible to control said bending force by utilizing a measured value of said rolling load to cause a good workpiece shape to be formed.

Figure 5:
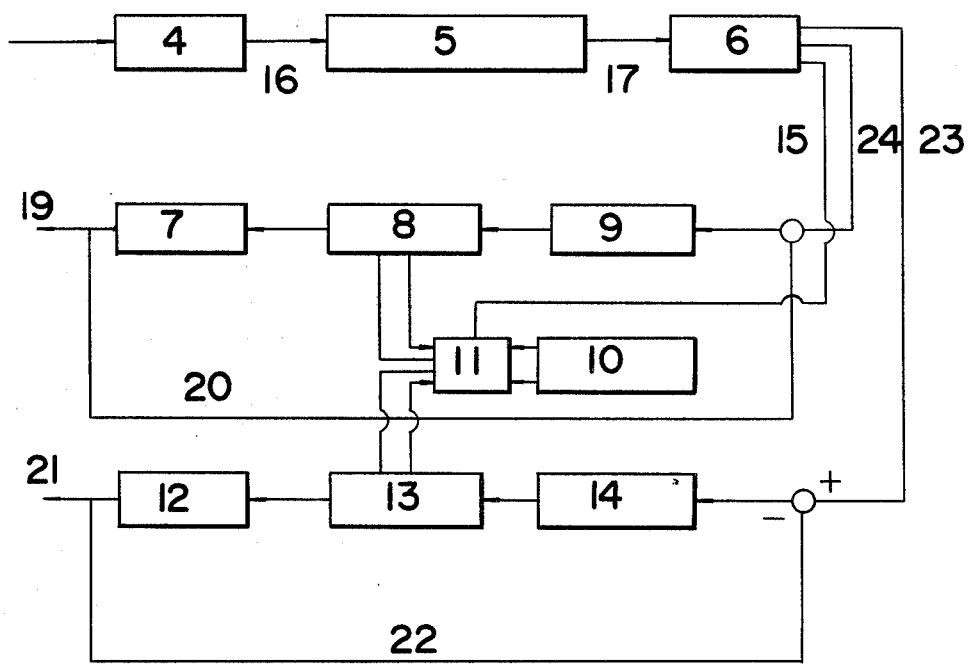
FIG. 5 is a block diagram of a control system, in one embodiment of the present invention, for a correcting apparatus.

FIG. 5 is a block diagram showing a control system to make the above combination possible automatically. A measuring instrument 4 of a rolling load, such as a strain gauge provides a signal 16 representative of the load. This signal is required to be kept at a real value of said load, and accordingly must be free from any other static force. Signal 16 is applied to an electronic translator device 5, and its output signal 17 is applied to a sign converter 6 representative of the bending force. Signal 17 denotes the best suitable bending force, e.g. point C of FIG. 4. Translator device 5 includes an electronic unit storing the relationships of FIG. 4, as previously determined by calculation and experiments. Output signals generated from the converter 6 are branched into three branches. When the signal 17 is positive, an output signal 24 flows to a servo-unit 9; conversely, when signal 17 is negative, output signal 23 is applied to another servo-unit 14. The output produced from said servo-units 9 or 14 control operation of servo-valves 8 or 13, respectively. Power translators 7 or 12 then are operated with oil pressure obtained from said valves 8 or 13, to produce oil pressure forces 19 or 21 to actuate the back-up roll or the workroll, i.e. generate forces 1 or 2 shown in FIG. 2. The path 7–8–9 in FIG. 5 illustrates the signal flow in the case when the output signal is indicated as positive as delivered by converter 6. On the other hand, path 12–13–14 is that obtained when the above-mentioned signal is negative. Power for the path selected of the above two paths is obtained from a change-over unit 11 of the oil pressure circuit, actuated by a signal 15 generated from said converter 6. Oil-pressure power unit 10 supplies changeover unit 11. In an actual operating system, negative feedback is applied by lines 20 or 22, as desired so that the bending forces, i.e., the actual hydraulic pressures 19 or 21, maintain their stability.

When the relation between signal 16 and 17 through translator device 5 is a function expressed in linear form, device 5 may be constructed of a simple electronic circuit. Usually, however, translator device 5 is of necessity rather complex; thus, an electronic computer in the place of translator device 5 may be used. When utilizing a computer, the information of curves of FIG. 4 is stored in its memory to compute the suitable bending force on the basis thereof.

Figure 6:
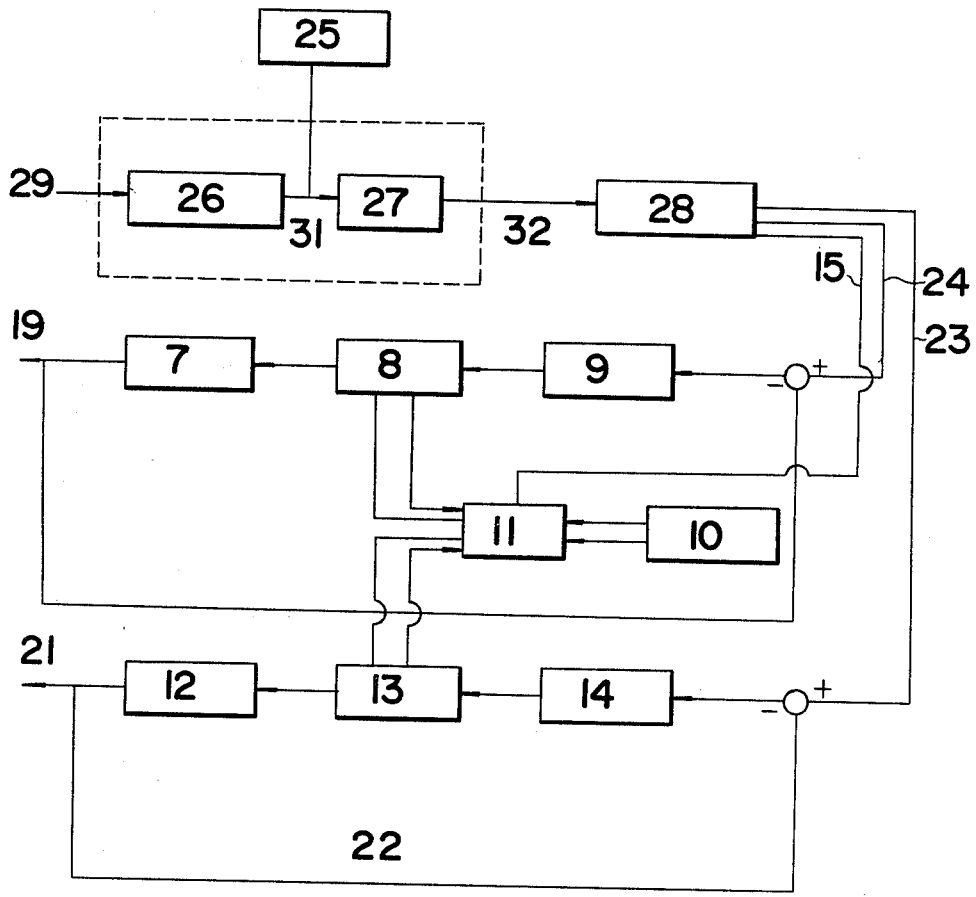
FIG. 6 is a block diagram of another control system, in a different embodiment of the present invention, including a pre-setting for the above apparatus when an electric computer is used.

FIG. 6 shows a control system for a conventional correcting apparatus using a computer fixed with stored information; the computer is illustrated in the section enclosed by the dotted line. Information signal 29, e.g. from a cold mill, is fed into the computer. Such data includes strip thickness before rolling and after rolling, front and back tension, properties of material, lubrication conditions, rolling speed, and roll diameter; for hot mills, further, temperature conditions. Values of the above data are first obtained on the basis of experimental facts and are set into a rolling load calculation unit 26 beforehand. A starting rolling load is obtained from the above data and a suitable representative signal 31 is introduced into bending force computer unit 27. The best suitable bending force for said rolling schedule is there computed exactly on the basis of load signal 31 applied to the curves in the memory unit, as stored within computer unit 27 and relating to FIG. 4. Output signal 32 is introduced to a converter 28. The apparatus following converter 28 can be the same as that after converter 6 of FIG. 5.

After the pre-setting as stated above, actual rolling is begun. During rolling, the rolling load will be measured continuously. So far as, however, the rolling schedule in storage is used, there is no necessity to consider other information, except the value of said rolling load. According to practical tests, it is found that the control system utilizing only said rolling load enables accomplishment of the expected objects. A rolling load signal generated from rolling load detecting unit 25 is entered directly into the above computer unit 27 after being converted into an electronic value. The input signal with regard to said actual load is converted into a suitable bending force signal within the computer unit 27, and to calculate the difference by comparison with the bending force value, as set in the table present in said unit 27. The error or difference signal 32 generated in said unit 27 then, during running operation, controls the apparatus, as before.

The best and most suitable bending force, in response to actual changes of said rolling load during said rolling, is thus caused to be applied. The continuous controlling system for the conventional workpiece shape correcting apparatus shown in FIG. 1 is also the same as said system mentioned above. In such a case, only one system of said servo-unit is needed for the correcting apparatus to continuously control the mill, because the bending force acts upon only one point.

The present invention may be utilized for not only the above-mentioned mills but also plate mill, skinpass or temper mill, stechel mill and all other rolling mills. As for workpieces rolled by the method of the present invention, ferrous and non-ferrous metals such as steel, aluminum, copper, stainless steel, nickel, tin and others can be used.

The present invention is based upon the discovery that a settled relation obtains between workpiece shape and rolling load and bending force. According to this discovery, it is possible to calculate the best suitable bending force by measuring only said rolling load. There is no necessity for measuring the workpiece shape after said rolling. The control system enables simplification of measuring without interrupting a continuous process.

The present invention has been described with a certain degree of particularity; it should be understood that the present disclosure has been made only by way of example and that numerous changes in the details of construction and combination and arrangement of parts may be resorted to without departing from the scope thereof. For example, it is easily possible to utilize the present invention for the conventional automatic gauge control system.

What is claimed is:

1. In apparatus for controlling the shape of a workpiece passing between the rolls of a rolling mill, said apparatus having means for measuring said rolling load and means for automatically and continuously controlling the rolling load in said apparatus, the improvement comprising:
   means storing data representative of a predetermined relationship correlating the width of the workpiece, the rolling load and the bending force;
   computing means coupled to said measuring means and utilizing said stored data for providing a first signal representative of the optimum rolling load corresponding to the optimum bending force and workpiece width in accordance with said predetermined relationship; and
   means responsive to said first signal for controlling the rolling load to result in said optimum bending force to thereby control the shape of said workpiece.

2. Apparatus according to claim 1 wherein said measuring means provides a signal representing continuously measured values of actual rolling load and thus of the values of the said workpiece size, comprising means comparing the signal provided by said measuring means and said first signal, and providing an error signal to control force between the work rolls.

3. Apparatus according to claim 2 wherein said apparatus further includes back-up rolls, said means responsive to said first signal acting between work roll and back-up roll, selectively in response to positive or negative signs of said error signal.

4. Apparatus according to claim 2 wherein said apparatus further includes back-up rolls and wherein said means responsive to said first signal acts between said back-up rolls.

References Cited

UNITED STATES PATENTS

| | | | |
|---|---|---|---|
| 2,611,150 | 9/1952 | Goulding | 72—245 |
| 2,903,926 | 9/1959 | Reichl | 72—243 |
| 3,171,305 | 3/1965 | Stone | 72—245 |

LOWELL A. LARSON, Primary Examiner

U.S. Cl. X.R.

72—243, 245